(12) United States Patent
Dougan, Jr. et al.

(10) Patent No.: US 9,528,391 B2
(45) Date of Patent: Dec. 27, 2016

(54) GAS TURBINE ENGINE OUTER CASE WITH CONTOURED BLEED BOSS

(75) Inventors: Donald Dougan, Jr., Wallingford, CT (US); Daniel Carminati, Berlin, CT (US); Cheng-Zhang Wang, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 788 days.

(21) Appl. No.: 13/551,149

(22) Filed: Jul. 17, 2012

(65) Prior Publication Data

US 2014/0023487 A1 Jan. 23, 2014

(51) Int. Cl.
| | | |
|---|---|---|
| *F01D 25/12* | (2006.01) | |
| *F01D 25/24* | (2006.01) | |
| *F02C 6/08* | (2006.01) | |
| *F04D 29/52* | (2006.01) | |

(52) U.S. Cl.
CPC ............ *F01D 25/243* (2013.01); *F01D 25/12* (2013.01); *F02C 6/08* (2013.01); *F04D 29/522* (2013.01); *F05D 2240/12* (2013.01); *F05D 2260/606* (2013.01); *Y02T 50/671* (2013.01)

(58) Field of Classification Search
CPC .... F04D 27/0215; F04D 27/0207; F02C 6/08; F02C 9/18; F01D 17/105; F01D 17/12; F01D 25/24; F01D 1/023; F01D 1/04; F01D 1/14; F01D 25/12; F05D 2260/606
See application file for complete search history.

(56) References Cited

U.S. PATENT DOCUMENTS

| | | | |
|---|---|---|---|
| 2,986,231 A | | 5/1961 | Hellstrom |
| 3,142,438 A | | 7/1964 | McKenzie |
| 3,597,106 A | | 8/1971 | Anderson |
| 4,008,977 A | | 2/1977 | Brown et al. |
| 4,053,254 A | | 10/1977 | Chaplin et al. |
| 4,063,847 A | | 12/1977 | Simmons |
| 4,329,114 A | | 5/1982 | Johnston et al. |
| 4,463,552 A | * | 8/1984 | Monhardt et al. ........... 60/226.1 |
| 4,711,084 A | | 12/1987 | Brockett |
| 4,844,689 A | | 7/1989 | Seed |
| 4,870,826 A | * | 10/1989 | Daguet et al. .................. 60/751 |
| 4,979,587 A | | 12/1990 | Hirt et al. |

(Continued)

FOREIGN PATENT DOCUMENTS

| | | |
|---|---|---|
| CA | 2 048 829 C | 5/1992 |
| EP | 0 487 242 B1 | 5/1992 |

(Continued)

OTHER PUBLICATIONS

International Search Report and Written Opinion, mailed Sep. 16, 2013.

(Continued)

*Primary Examiner* — Ninh H Nguyen
(74) *Attorney, Agent, or Firm* — Kinney & Lange, P.A.

(57) ABSTRACT

An axially extending outer case for a gas turbine engine comprises an arcuate case wall, an opening, a boss and contouring. The arcuate case wall has an inner surface and an outer surface. The opening extends through the arcuate case wall. The boss extends radially from the outer surface of arcuate case wall and surrounds the opening. The contouring surrounds the opening along the inner surface of the arcuate case wall within the boss.

20 Claims, 4 Drawing Sheets

(56) References Cited

U.S. PATENT DOCUMENTS

| | | | |
|---|---|---|---|
| 5,059,093 A | 10/1991 | Khalid et al. | |
| 5,117,629 A | 6/1992 | Shaw | |
| 5,127,794 A | 7/1992 | Burge et al. | |
| 5,155,993 A * | 10/1992 | Baughman et al. | 60/226.1 |
| 5,160,241 A | 11/1992 | Glynn | |
| 5,203,162 A | 4/1993 | Burge | |
| 5,209,633 A | 5/1993 | McGreehan et al. | |
| 5,224,824 A | 7/1993 | Eng | |
| 5,261,228 A | 11/1993 | Shuba | |
| 5,351,473 A | 10/1994 | Shuba | |
| 5,351,478 A | 10/1994 | Walker et al. | |
| 5,351,565 A | 10/1994 | Wada et al. | |
| 5,531,565 A | 7/1996 | Meindl et al. | |
| 5,845,482 A | 12/1998 | Carscallen | |
| 6,325,595 B1 | 12/2001 | Breeze-Stringfellow et al. | |
| 6,550,254 B2 | 4/2003 | Proctor et al. | |
| 6,647,730 B2 | 11/2003 | Liu | |
| 6,663,346 B2 | 12/2003 | Munsell et al. | |
| 6,782,702 B2 | 8/2004 | Charon et al. | |
| 6,783,324 B2 * | 8/2004 | Muny | 415/144 |
| 7,197,881 B2 | 4/2007 | Winstanley | |
| 7,249,929 B2 | 7/2007 | Cummings et al. | |
| 7,364,404 B2 | 4/2008 | Guemmer | |
| 7,559,203 B2 | 7/2009 | Stastny et al. | |
| 7,594,793 B2 | 9/2009 | Guemmer | |
| 7,717,667 B2 | 5/2010 | Urbassik et al. | |
| 8,024,935 B2 | 9/2011 | Hoover et al. | |
| 8,152,460 B2 | 4/2012 | Brunet et al. | |
| 2004/0191058 A1 | 9/2004 | Baumann et al. | |
| 2006/0266051 A1 | 11/2006 | Gukeisen et al. | |
| 2006/0277919 A1 | 12/2006 | Martensson et al. | |
| 2008/0072566 A1 | 3/2008 | Eleftheriou et al. | |
| 2008/0115504 A1 * | 5/2008 | Martensson et al. | 60/785 |
| 2009/0000306 A1 | 1/2009 | Damle et al. | |
| 2009/0297335 A1 * | 12/2009 | Karafillis et al. | 415/115 |
| 2009/0301102 A1 | 12/2009 | Clemen et al. | |
| 2010/0199633 A1 | 8/2010 | Martensson et al. | |
| 2010/0236256 A1 | 9/2010 | Hussain et al. | |
| 2010/0275613 A1 | 11/2010 | Alasti et al. | |
| 2011/0265490 A1 | 11/2011 | Klasing et al. | |

FOREIGN PATENT DOCUMENTS

| | | |
|---|---|---|
| EP | 1 632 662 A2 | 3/2006 |
| EP | 1653054 A1 | 5/2006 |
| EP | 1 801 402 A2 | 6/2007 |
| EP | 1 856 398 A | 11/2007 |
| EP | 1 801 403 A2 | 12/2007 |
| EP | 2 103 792 B1 | 8/2011 |
| JP | 4284136 A | 10/1992 |
| JP | 2008531914 A | 8/2008 |
| RU | 2402688 C2 | 10/2010 |
| WO | WO 2006/091138 A1 | 8/2006 |
| WO | WO 2006/091142 A1 | 8/2006 |

OTHER PUBLICATIONS

European Patent Office, extended European Search report, Feb. 3, 2016, 7 pages.

* cited by examiner

GAS TURBINE ENGINE OUTER CASE WITH CONTOURED BLEED BOSS

BACKGROUND

Gas turbine engines operate by passing a volume of high energy gases through a plurality of stages of vanes and blades, each having an airfoil, in order to drive turbines to produce rotational shaft power. The shaft power is used to drive a compressor to provide compressed air to a combustion process to generate the high energy gases. Additionally, the shaft power may be used to drive a generator for producing electricity, or to drive a fan for producing high momentum gases for producing thrust. In order to produce gases having sufficient energy to drive the compressor, generator and fan, it is necessary to combust the fuel at elevated temperatures and to compress the air to elevated pressures, which also increases its temperature.

A typical gas turbine engine is also used to power other systems in which the gas turbine engine operates. For example, gas turbine engines provide air for environmental control systems (ECS) that provide cabin air to the aircraft after sufficient conditioning. The air for the ECS is typically bled from the high pressure compressor. The siphoned compressor bleed air is typically routed from the compressor flow path, through a compressor case structure, through other components in the gas turbine engine, and out to the ECS. As such, the bleed air must pass through rotating and non-rotating components between the high pressure compressor and the ECS. Routing of the cooling air in such a manner incurs aerodynamic losses that require bleeding of an increased volume of air, thereby reducing the efficiency of the compressor and the gas turbine engine. There is, therefore, a continuing need to improve aerodynamic efficiencies in bleeding air from compressors within gas turbine engines, particularly at the point of departure from the compressor case structure.

SUMMARY

The present invention is directed toward a bleed boss for a gas turbine engine outer case. An axially extending outer case comprises an arcuate case wall, an opening, a boss and contouring. The arcuate case wall has an inner surface and an outer surface. The opening extends through the arcuate case wall. The boss extends radially from the outer surface of arcuate case wall and surrounds the opening. The contouring surrounds the opening along the inner surface of the arcuate case wall within the boss.

DETAILED DESCRIPTION

Figure 1:
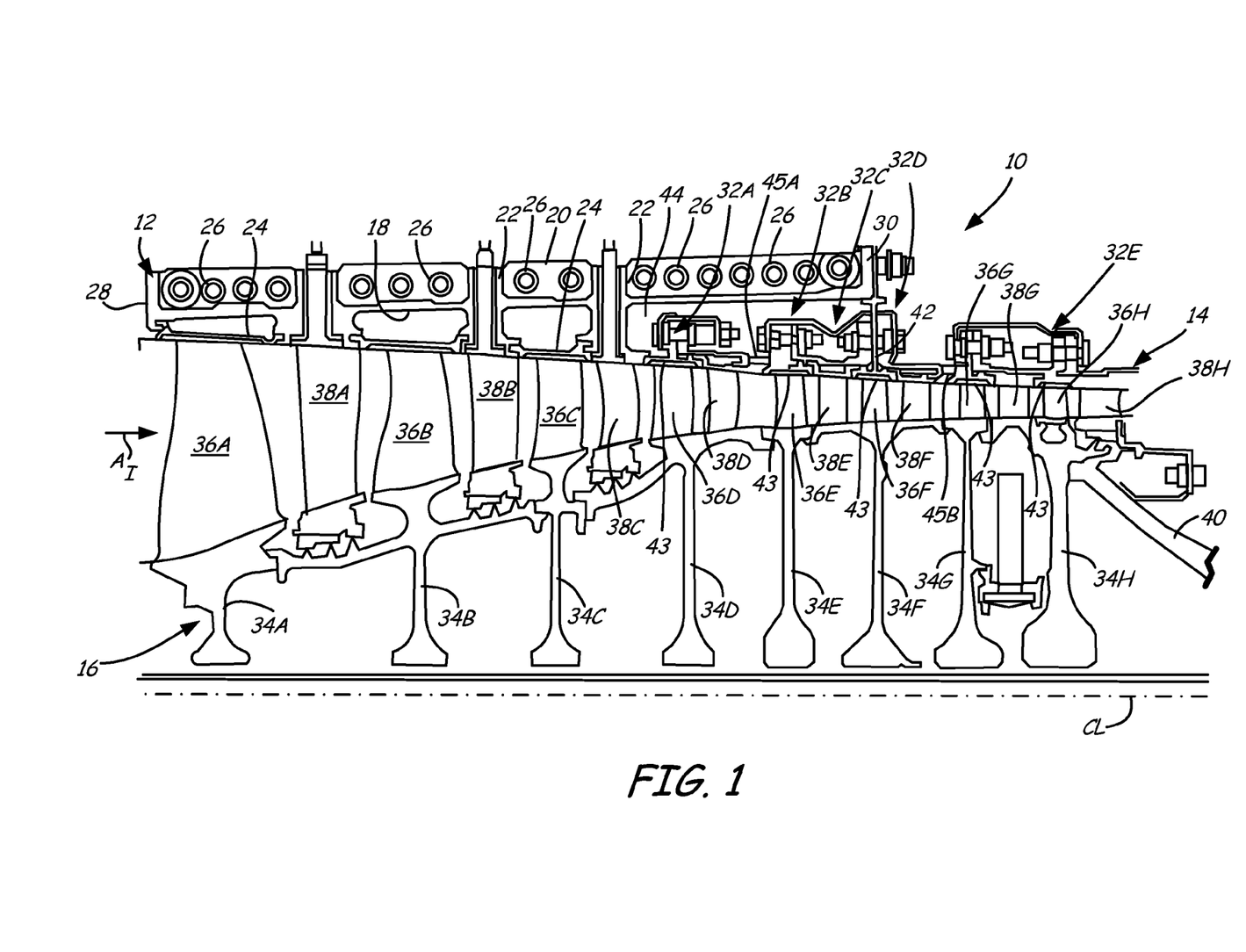
FIG. 1 shows a cross-section of a high pressure compressor section of a gas turbine engine including a split case and an inner case circumscribing a high pressure compressor spool.

FIG. 1 shows a cross-section of high pressure compressor section 10 of a gas turbine engine including split case 12 and inner case 14 circumscribing high pressure compressor spool 16. Split case 12 includes semi-annular body 18, split flange 20, variable vane bosses 22, seals 24, flange holes 26, forward flange 28 and aft flange 30. Inner case 14 includes a plurality of seal segments 32A-32E. High pressure compressor spool 16 includes rotors 34A-34H, blades 36A-36H, vanes 38A-38H and shaft 40.

Split case 12, inner case 14, high pressure compressor spool 16 and the rest of the gas turbine engine surround engine centerline CL. Semi-annular body 18, which in the described embodiment comprises a one-hundred-eighty degree shell, is bolted to another semi-annular body (not shown) at split flange 20 to define an annular compressor case. For example, threaded fasteners are passed through flange holes 26 that align with holes in an adjacent flange of the other semi-annular body. Forward flange 28 couples to a low pressure compressor case, while aft flange 30 couples to an intermediate case of the gas turbine engine in which high pressure compressor section 10 is used. Seals 24 are inserted into slots on an inner side of semi-annular body 18 to provide outer diameter seals for blades 36A-36C. Semi-annular body 18 also includes variable vane bosses 22 for receiving trunnions of vanes 38A, 38B and 38C.

Inner case 14 is coupled to split case 12 at aft flange 30. In particular, radial hanger 42 is coupled between seal segments 36C and 36D, and joins to the fasteners used to join aft flange 30 to the intermediate case. Seal segments 32A-32E include seals 43 for sealing against blades 36D-36H, and slots for receiving outer diameter ends of vanes 38D-38G. Seal segment 32A includes seal 43 that adjoins blade 36D. Seal segment 32B includes a slot that receives vane 38D and includes seal 43 that adjoins blade 36E. Seal segment 32C includes a slot that receives vane 38E. Hanger 42 includes seal 43 that adjoins blade 36F. Seal segment 32D includes a slot that receives vane 38F and seal 43 that adjoins blade 36G. Seal segment 32E includes a slot that receives vane 38G and seal 43 that adjoins blade 36H. Seal segments 32A-32E are bolted to each other to form a rigid annular structure that is spaced radially inward of split case 12 to form plenum 44.

Blades 36A-36H extend radially outward from rotors 34A-34H. Rotors 34A-34H are axially connected to each other and shaft 40, via any suitable coupling as is known in the art, to define an inner diameter flow path boundary. Rotors 34A-34H includes various seals, such as knife edge, labyrinth or abradable seals, to seal against inner diameter ends of vanes 38A-38H. Vanes 38A-38H extend radially inward from split case 12 and inner case 14 so as to be interposed with blades 36A-36H. Split case 12 and inner case 14 are axially connected to each other to define an outer diameter flow path boundary. Split case 12 and inner case 14 include seals 24 and seals 43, respectively, to seal against outer diameter ends of blades 36A-36H. In the disclosed embodiment, seals 24 and 43 comprise abradable seals.

Shaft 40 is driven by a high pressure turbine (not shown) to cause rotation of rotors 34A-34H. Rotation of rotors 34A-34H forces inlet air $A_I$ through the flow path formed by split case 12 and inner case 14, and rotors 34A-34H. Inlet air $A_I$ is compressed as it passes through blades 36A-36H and vanes 38A-38H. Vane 38H comprises an inlet guide vane for directing compressed inlet air $A_I$ into a combustor (not shown).

Inner case 14 includes bleed ports 45A and 45B, which permit a volume of compressed inlet air $A_I$ to be siphoned from the main gas flow path. Siphoned inlet air $A_I$ enters plenum 44 and is thus circumferentially distributed within semi-annular body 18 via the swirling of inlet air $A_I$ produced by rotation of blades 36A-36H. From plenum 44, compressed inlet air $A_I$ can be passed through various bosses in split case 12 for routing to various systems of the gas turbine engine or other external systems. For example, relatively cooler compressed inlet air $A_I$ can be routed to various components in the hot section of the gas turbine engine (e.g. combustor or turbine) to provide cooling. Similarly, compressed inlet air $A_I$ can be routed to an environmental control system interconnected with gas turbine engine. Because inlet air $A_I$ passes from a rotating path into a stationary path when bled during operation of the gas turbine engine, dynamic losses, such as drag, are generated, thereby decreasing efficiency of compressor spool 16 and the overall operating efficiency of the gas turbine engine. The bleed boss of the present invention aerodynamically eases the transition between rotating and non-rotating flow paths to decrease turbulence and drag, and increase compressor and engine efficiency.

Figure 2:
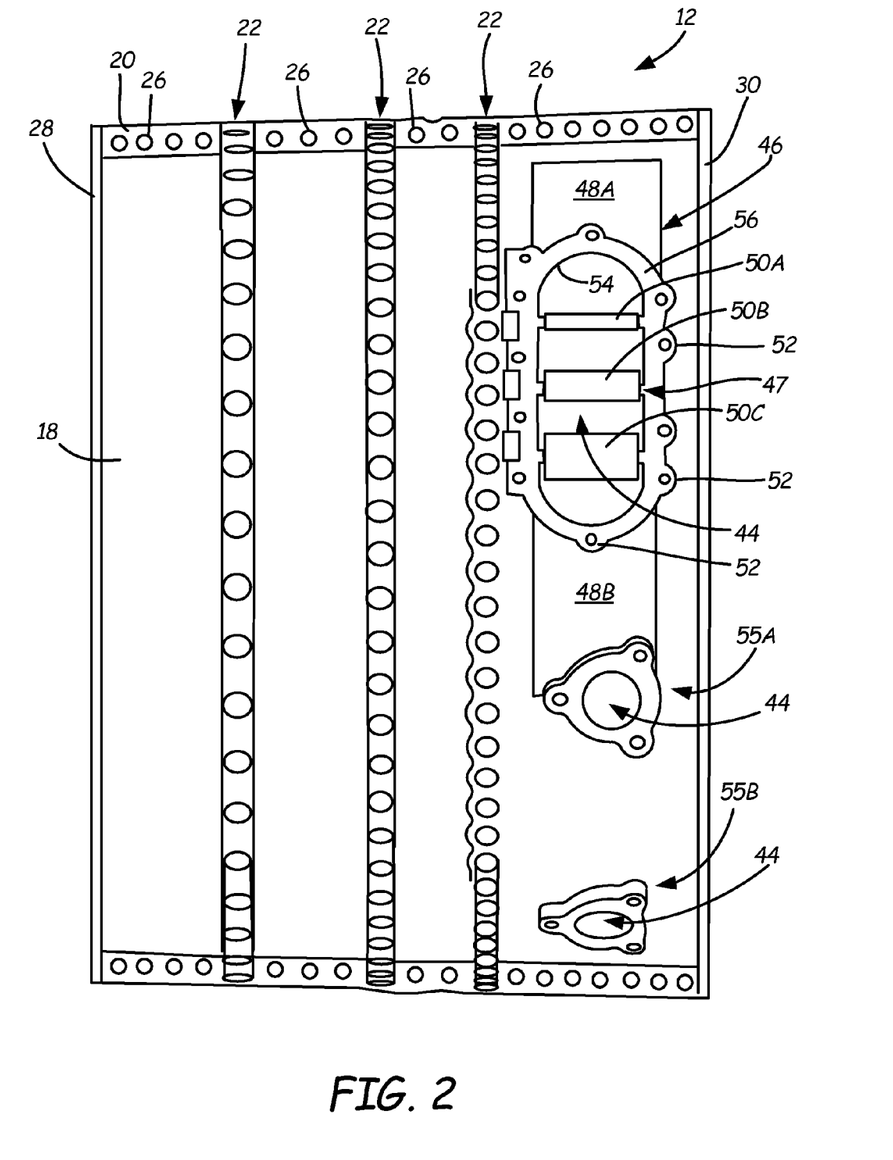
FIG. 2 is a side view of the split case of FIG. 1 showing an environmental control system (ECS) boss of the present invention.
Figure 4:
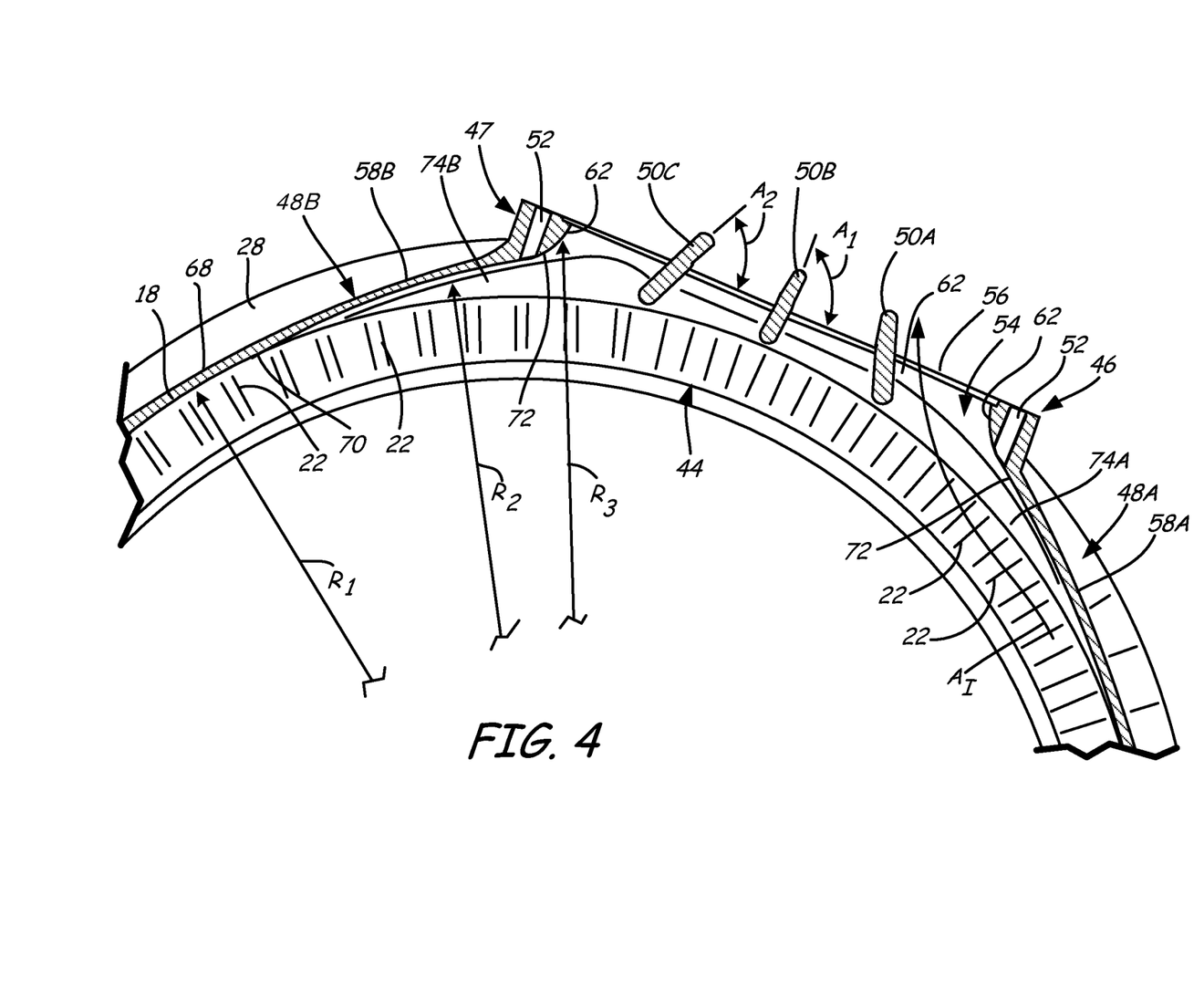
FIG. 4 is a cross-sectional view of the ECS boss taken at section 4-4 of FIG. 3 showing guide vanes arranged between contoured flange sidewalls.

FIG. 2 is a side view of split case 12 of FIG. 1 showing environmental control system (ECS) boss 46 of the present invention. ECS boss 46 includes flange 47, bump-outs 48A and 48B, vanes 50A-50C, bolt holes 52 and opening 54. Flange 47 is also aerodynamically contoured within opening 54, as shown in FIG. 4. ECS boss 46 is used to bleed air from plenum 44 within semi-annular body 18. Split case 12 also includes bosses 55A and 55B, which can be used to bleed air from plenum 44 within semi-annular body 18 such as for providing cooling air to the high pressure turbine. Although the invention is described with reference to ECS boss 46, bump-outs 48A and 48B, vanes 50A-50C and contouring may be applied to bosses used to bleed air for other purposes.

ECS boss 46 comprises an oblong circular shape that defines opening 54. ECS boss 46 is elongated in the circumferential direction, relative to engine centerline CL (FIG. 1). Flange 47 circumscribes opening 54 and therefore also comprises an oblong circular shape. Flange 47 comprises a wall having a width that defines outer surface 56. Outer surface 56 comprises a flat surface against which other components, such as duct-work, conduit or piping, can be easily mated. Outer surface 56 is sufficiently wide to accommodate bores 52, which facilitate coupling of the other components to ECS boss 46. Flange 47 is shown as being crenellated, scalloped or indented between bores 52 for weight-reduction purposes. Flange 47 may also blend into, or be integral with, variable vane bosses 22.

Bump-outs 48A and 48B comprise portions of semi-annular body 18 that are arcuately flared radially outward. Bump-outs 48A and 48B comprise rams formed into semi-annular body 18 that extend in the circumferential direction to funnel air toward opening 54 of ECS boss 46, as is discussed in greater detail with reference to FIG. 3. Vanes 50A, 50B and 50C extend across opening 54 to opposite sides of flange 47. Vanes 50A-50C extend axially, parallel to engine centerline CL (FIG. 1). Vanes 50A-50C are identical in shape, but are oriented at different angles relative to outer surface 56, as is discussed in greater detail with reference to FIG. 4.

Figure 3:
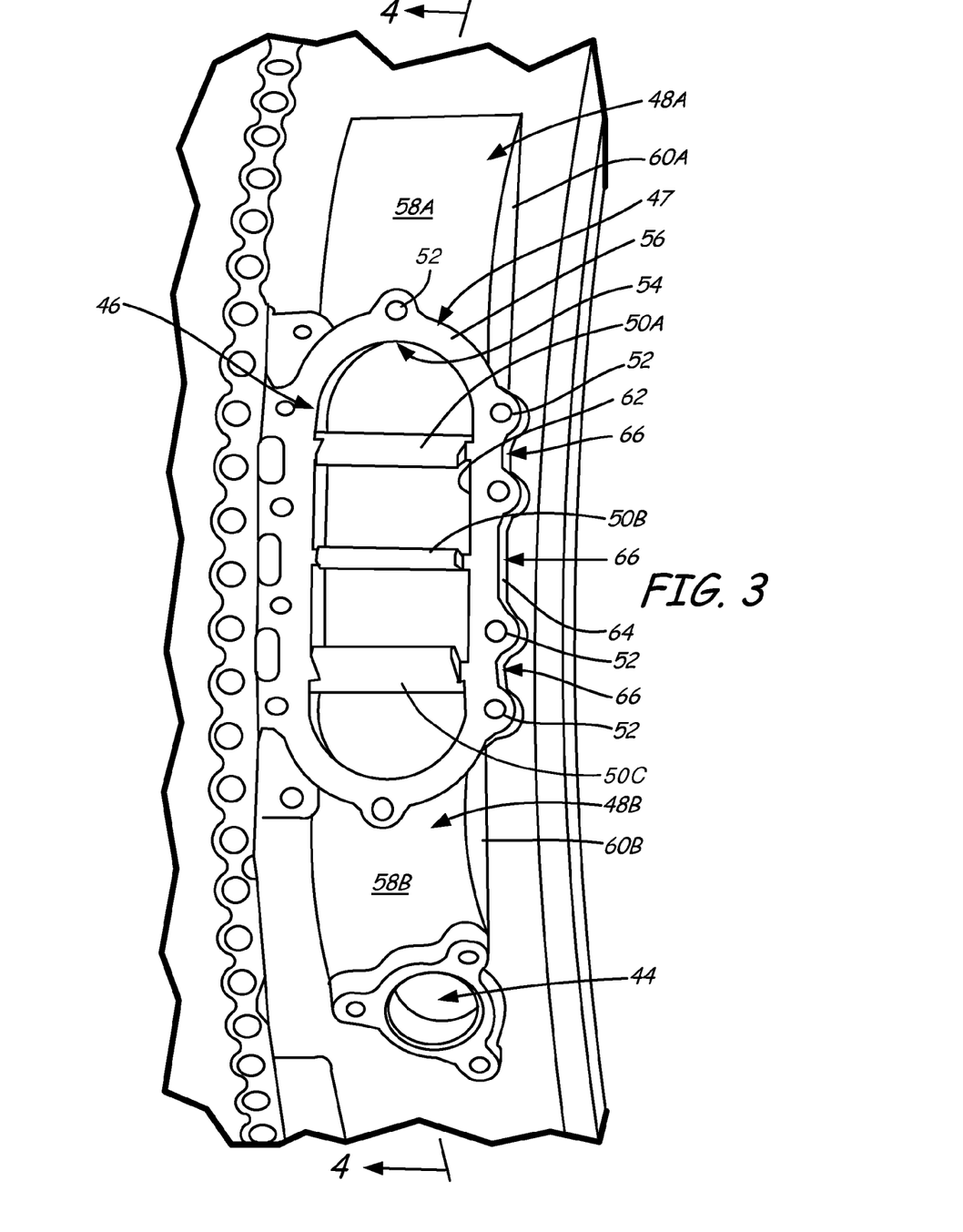
FIG. 3 is close-up perspective view of the ECS boss of FIG. 2 showing bump-outs and a set of guide vanes.

FIG. 3 is close-up perspective view of ECS boss 46 of FIG. 2 showing bump-outs 48A and 48B and guide vanes 50A-50C. Bump-outs 48A and 48B include arcuate outer surfaces 58A and 58B, and arced sidewalls 60A and 60B, respectively. ECS boss 46 includes holes 52, opening 54, outer surface 56, inner sidewall 62, outer sidewall 64 and scallops 66.

Vanes 50A, 50B and 50C extend axially across opening 54 between opposing surfaces of inner sidewall 62. Vanes 50A, 50B and 50C extend radially out of boss 46 so as to extend beyond outer surface 56. As such, vanes 50A, 50B and 50C can be used to guide inlet air $A_I$ leaving boss 46. For example, vanes 50A-50C redirect inlet air from flowing in a circumferential direction to a radial direction.

Bump-outs 48A and 48B are axially as wide as opening 54. As viewed from the exterior of split case 12, arcuate outer surfaces 58A and 58B extend from the outer surface of semi-annular body 18 toward ECS boss 46, gaining height therebetween. ECS boss 46 is positioned between bump-outs 48A and 48B, where bump-outs 48A and 48B are tallest. The thickness of semi-annular body 18 remains generally constant throughout bump-outs 48A and 48B such that, as can be seen in FIG. 4, bump-outs 48A and 48B locally increase the radius of semi-annular body 18. Thus, as viewed from the interior of split case 12, arcuate outer surfaces 58A and 58B extend from the inner surface of semi-annular body 18 toward ECS boss 46, gaining depth therebetween. Bump-outs 48A and 48B therefore increase the angle between the interior surface of semi-annular body 18 and inner sidewall 62, thereby reducing the abruptness of the turn that inlet air $A_I$ must make to exit boss 46.

FIG. 4 is a circumferential cross-sectional view of ECS boss 46 taken at section 4-4 of FIG. 3 showing guide vanes 50A, 50B and 50C arranged between contoured flange inner sidewall 62. Semi-annular body 18 includes outer surface 68 and inner surface 70, as well as bump-outs 48A and 48B. Boss 46 includes flange 47, which includes outer surface 56, inner sidewall 62 and contouring 72.

Semi-annular body 18 includes bump-outs 48A and 48B, which comprise portions of semi-annular body 18 where a local radius of semi-annular body 18 is increased with respect to engine centerline CL (FIG. 1). For example, circumferentially outside of bump-outs 48A and 48B, inner surface 70 of semi-annular body 18 has radius $R_1$. Arcuate outer surfaces 58A and 58B of bump-outs 48A and 48B, respectively, increase the local radius of semi-annular body 18 as bump-outs 48A and 48B extend circumferentially toward flange 47 of ECS boss 46. For example, circumferentially within bump-outs 48A and 48B, inner surface 70 of semi-annular body 18 has radius $R_2$, wherein $R_2$ is greater than $R_1$. Radius $R_2$ continuously increases from radius $R_1$ to the intersection with flange 47. As such, sidewalls 74A and 74B of bump-outs 48A and 48B, respectively, take on arced shapes, and outer surfaces 58A and 58B of bump-outs 48A and 48B, respectively, takes on an arcuate shape. Bump-outs 48A and 48B therefore widen the angle of the intersection of inner surface 70 with sidewall 62, thereby facilitating flow of inlet air from plenum 44 through flange 47.

Contouring 72 blends inner surface 70 of bump-out 48A and bump-out 48B with the surface of inner sidewall 62. Contouring 72 provides a smooth transition between semi-annular body 18 and flange 47, thereby removing any edges over which inlet air $A_I$ must traverse. Inner surface 70 and inner sidewall 62 are blended by contouring 72 into a single, continuous surface. Contouring 72 further increases the local radius of semi-annular body 18. For example, inner surface 70 of semi-annular body 18 has radius $R_3$ at contouring 72, wherein $R_3$ is greater than $R_2$. Contouring again widens the angle of the intersection of inner surface 70 with sidewall 62. Thus, bump-outs 48A and 48B work together with contouring 72 to gradually change the circumferential flow of inlet air $A_I$ within plenum 44 to radial flow within boss 46.

Boss 46 further includes vanes 50A, 50B and 50C that catch inlet air $A_I$ flowing within bump-outs 48A and 48B and turn the flow into radially outward flow. Vanes 50A, 50B and 50C thus extend radially inward of boss 46 so as to extend into bump-outs 48A and 48B. Similarly, vanes 50A, 50B and 50C extend radially outward of boss 46 beyond outer surface 56. Vanes 50A, 50B and 50C are circumferentially oriented to direct inlet air $A_I$ toward the center of boss 46, thereby funneling flow of inlet air $A_I$ into whatever conduit, piping or ductwork connected to flange 47, such as at holes 52. Vanes 50A, 50B and 50C are oriented to function beneficially for flow of inlet air $A_I$ in either circumferential direction. Specifically, vane 50B is circumferentially oriented generally perpendicular to outer surface 56 of flange 47. As such, angle $A_I$ is approximately ninety degrees. Thus, inlet air $A_I$ flowing in either circumferential direction will impact vane 50B and flow radially outward near the center of boss 46. Vanes 50A and 50C are angled obliquely to outer surface 56 of flange 47 to direct inlet air $A_I$ toward the flow of inlet air $A_I$ deflected by vane 50B. For example, vane 50C is circumferentially oriented so that angle $A_2$ is approximately sixty degrees. Thus, clockwise circumferential flow of inlet air $A_I$ will flow over the top (with reference to the orientation of FIG. 4) of vane 50C toward the center of boss 46. Counter-clockwise flow of inlet air $A_I$ will flow under the bottom (with reference to the orientation of FIG. 4) of vane 50C and be redirected backwards toward the center of boss 46. Vane 50A is circumferentially oriented the opposite as vane 50C.

The present invention provides a bleed boss for gas turbine engine outer casings that reduce turbulence and drag of air bleed from the engine. As such, a smaller volume of air can be bled, increasing engine efficiency. The bleed boss of the present invention utilizes contouring, which can be optimized using computational fluid dynamics (CFD) software programs, to blend surfaces forming the flow path of the boss to eliminate sharp edges. Further, the bleed boss of the present invention includes bump-outs which provide large scale blending or contouring of the boss flow path to reduce tight angles between adjacent surfaces. Additionally, the bleed boss of the present invention includes vanes that turn airflow within the boss to a beneficial radial orientation that better directs bled air into a structure coupled to the boss. Thus, airflow from within the outer casing is gently and smoothly guided and turned from circumferential flow within the casing to radial flow outside the casing. The air is thereby more efficiently utilized for other applications, such as cooling air and environmental control system air.

DISCUSSION OF POSSIBLE EMBODIMENTS

The following are non-exclusive descriptions of possible embodiments of the present invention.

An axially extending outer case for a gas turbine engine comprising an arcuate case wall having an inner surface and an outer surface, an opening extending through the arcuate case wall, a boss extending radially from the outer surface of arcuate case wall and surrounding the opening, and contouring surrounding the opening along the inner surface of the arcuate case wall within the boss.

The axially extending outer case of the preceding paragraph can optionally include, additionally and/or alternatively, any one or more of the following features, configurations and/or additional components:

contouring that provides a smooth transition between the inner surface of the arcuate case wall and the boss;
a boss comprising a flange surrounding the opening, the flange having: an inner sidewall; an outer boss surface; and an outer sidewall;
a flange comprising: a plurality of holes extending through an outer boss surface; and a plurality of indentations in an outer sidewall between adjacent holes;
contouring that blends the inner surface of the arcuate case wall with an inner sidewall of the boss;
a first guide vane extending axially across the opening and oriented circumferentially obliquely to an outer boss surface; a second guide vane extending axially across the opening and oriented circumferentially obliquely to the outer boss surface; a third guide vane extending axially across the opening between the first and second guide vanes and oriented circumferentially perpendicular to the outer boss surface;
a circumferentially extending bump-out extending along the arcuate case wall and into which the opening extends;
a bump-out that increases a local radius of the arcuate case wall as compared to a radius of inner and outer surfaces of the arcuate case wall with respect to a centerline;
contouring that further increases a local radius of the arcuate case wall;
a bump-out that increases in depth as it circumferentially extends from the outer surface of the arcuate case wall toward the boss;
contouring that blends a bump-out with the boss;
a ramp embedded in the arcuate case wall forming a funnel directed toward the opening;
a set of guide vanes extending across the boss within the opening;
vanes of a set of guide vanes orientated towards a circumferential center of the opening;
vanes of a set of guide vanes extending radially outward beyond the boss;
an inner case coupled to the arcuate case wall so as to be disposed within the inner surface adjacent the opening; and a bleed port extending through the inner case.

A compressor section of a gas turbine engine comprising a compressor spool comprising a plurality of radially extending blades configured to rotate about an axial engine centerline to produce a flow of compressed air; an inner case disposed radially outward of the compressor spool, the inner case including a bleed port to receive compressed air from the flow of compressed air; and an outer case coupled to the inner case to define a plenum disposed between the outer case and the inner case, the outer case including a boss having a smoothed inlet opening.

The compressor section of a gas turbine engine of the preceding paragraph can optionally include, additionally and/or alternatively, any one or more of the following features, configurations and/or additional components:

a boss further comprising: a set of guide vanes extending axially across the boss within the smoothed inlet opening;
vane of a set of guide vanes is orientated towards a circumferential center of the smoothed inlet opening;
a boss further comprising: a circumferential funnel that extends along the outer case and into which the smoothed inlet opening extends, the circumferential funnel increasing in height as it circumferentially extends from an outer surface of outer case to an outer surface of the boss;
a smoothed inlet opening that blends the circumferentially funnel with the boss;
a boss comprising: a flange surrounding the smoothed inlet opening, the flange having: an inner sidewall; an outer surface; an outer sidewall; a plurality of holes extending through the outer surface; and a plurality of indentation in the outer sidewall between adjacent holes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An axially extending outer case for a gas turbine engine, the outer case comprising:
   an arcuate case wall having an inner surface and an outer surface;
   an opening extending through the arcuate case wall;
   a boss extending radially from the outer surface of the arcuate case wall and surrounding the opening, wherein the boss comprises:
      a flange surrounding the opening, the flange having:
         an inner sidewall;
         an outer boss surface; and
         an outer sidewall;
   a bump-out extending circumferentially along the arcuate case wall, a portion of the bump-out forming a corner of a flow path that extends from an interior of the arcuate case to the flange, wherein the bump-out increases a local radius of the arcuate case wall as compared to a radius of the inner and outer surfaces with respect to a centerline; and
   contouring surrounding the opening along the inner surface of the arcuate case wall within the boss, wherein the contouring provides a smooth transition between the inner surface of the arcuate case wall and the inner sidewall;
   wherein:
      the inner surface adjoins the bump-out at an inner edge of the corner;
      the inner sidewall adjoins the bump-out at an outer edge of the corner;
      a first projection extending from the inner edge tangent to the inner surface at the corner forms a first, obtuse, intersection angle with a second projection extending from the outer edge and parallel to the inner sidewall at the corner;
      a third projection extending from the inner edge tangent to the bump-out at the corner forms a second intersection angle with the second projection that is greater than the first, obtuse, intersection angle; and
      a region swept by the first and second intersection angles encompass the corner.

2. The axially extending outer case of claim 1 wherein the flange further comprises:
   a plurality of holes extending through the outer boss surface; and
   a plurality of indentations in the outer sidewall between adjacent holes.

3. The axially extending outer case of claim 1 and further comprising:
   a first guide vane extending axially across the opening and oriented circumferentially obliquely to the outer boss surface;
   a second guide vane extending axially across the opening and oriented circumferentially obliquely to the outer boss surface;
   a third guide vane extending axially across the opening between the first and second guide vanes and oriented circumferentially perpendicular to the outer boss surface.

4. The axially extending outer case of claim 1 wherein the contouring further increases the local radius of the arcuate case wall.

5. The axially extending outer case of claim 1 wherein the bump-out increases in depth as it circumferentially extends from the outer surface of the arcuate case wall toward the boss.

6. The axially extending outer case of claim 1 wherein the contouring blends the bump-out with the boss.

7. The axially extending outer case of claim 1 and further comprising:
   a ramp embedded in the arcuate case wall forming a funnel directed toward the opening.

8. The axially extending outer case of claim 1 and further comprising
   a set of guide vanes extending across the boss within the opening.

9. The axially extending outer case of claim 8 wherein each vane of the set of guide vanes is orientated towards a circumferential center of the opening.

10. The axially extending outer case of claim 8 wherein each vane of the set of guide vanes extends radially outward beyond the boss.

11. The axially extending outer case of claim 1 and further comprising:
    an inner case coupled to the arcuate case wall so as to be disposed within the inner surface adjacent the opening; and
    a bleed port extending through the inner case.

12. A compressor section of a gas turbine engine, the compressor section comprising:
    a compressor spool comprising a plurality of radially extending blades configured to rotate about an axial engine centerline to produce a flow of compressed air;
    an inner case disposed radially outward of the compressor spool, the inner case including a bleed port to receive compressed air from the flow of compressed air;
    an outer case coupled to the inner case to define a plenum disposed between the outer case and the inner case, the outer case including an inner surface and a boss having a smoothed inlet opening, wherein the boss comprises:
       a flange surrounding the smoothed inlet opening, the flange comprising:
          an inner sidewall;
          an outer surface; and
          an outer sidewall;
    a circumferential funnel that extends along the outer case and into which the smoothed inlet opening extends, the circumferential funnel increasing in height as it circumferentially extends from an outer surface of the outer case to the outer surface of the flange, wherein the circumferential funnel forms a flow path extending from the plenum to the flange, and wherein adjoining portions of the inner surface, the circumferential funnel, and the inner sidewall form a corner of the flow path;
    wherein:
       the inner surface adjoins the circumferential funnel at an inner edge of the corner;

the inner sidewall adjoins the circumferential funnel at an outer edge of the corner;
a first projection extending from the inner edge tangent to the inner surface at the corner forms a first, obtuse, intersection angle with a second projection extending from the outer edge and parallel to the inner sidewall at the corner;
a third projection extending from the inner edge and tangent to the circumferential funnel forms a second intersection angle with the second projection that is greater than the first intersection angle; and
the first and second intersection angles sweep a region containing the corner of the flow path.

13. The compressor section of claim 12 wherein the boss further comprises:
a set of guide vanes extending axially across the boss within the smoothed inlet opening.

14. The compressor section of claim 13 wherein each vane of the set of guide vanes is orientated towards a circumferential center of the smoothed inlet opening.

15. The compressor section of claim 12 wherein the smoothed inlet opening blends the circumferentially funnel with the boss.

16. The compressor section of claim 12 wherein the flange further comprises:
a plurality of holes extending through the outer surface; and
a plurality of indentation in the outer sidewall between adjacent holes.

17. An outer case for a gas turbine engine, the outer case comprising:
an arcuate case wall extending circumferentially about a centerline axis and having an inner surface circumscribing the centerline axis, wherein the arcuate wall defines a first opening extending through the arcuate case wall from the inner surface;
a flange wall extending outward relative to the arcuate case wall, wherein the flange wall defines a second opening that is smaller than and aligned with the first opening; and
a bump-out surface adjoining the inner surface at an inner edge and adjoining the flange wall at an outer edge, the bump-out surface extending circumferentially and radially outward relative to the centerline axis from the inner edge to the outer edge;
wherein the bump-out surface and portions of the inner surface and the flange wall adjoining the bump-out surface form a bend of a fluid path extending from interior of the arcuate case wall through the first and second openings;
wherein a first projection extending from the inner edge and tangent to the inner surface at the bend forms a first intersection angle with a second projection extending from the outer edge and parallel to the flange wall at the bend;
wherein the first intersection angle is obtuse and sweeps a region containing the bend;
wherein a third projection extending from the inner edge and tangent to the bump-out surface at the bend forms a second intersection angle with the second projection; and
wherein the second intersection angle is greater than the first intersection angle and sweeps the region containing the bend.

18. The outer case of claim 17, wherein contouring provides a smooth transition between the inner surface of the arcuate case wall and the bump-out surface.

19. The outer case of claim 17 and further comprising:
a set of guide vanes disposed within the second opening, wherein each vane of the set of guide vanes is orientated towards a circumferential center of the second opening.

20. The outer case of claim 17 and further comprising:
an inner case coupled to the arcuate case wall so as to be disposed within the inner surface adjacent the first opening; and
a bleed port extending through the inner case.

* * * * *